United States Patent [19]
Masuda et al.

[11] Patent Number: 5,745,117
[45] Date of Patent: Apr. 28, 1998

[54] SYSTEM AND METHOD OF CREATING A THREE-DIMENSIONAL SOLID MODEL FROM A PLURALITY OF TWO-DIMENSIONAL DRAWINGS

[75] Inventors: Hiroshie Masuda, Yamato; Masayuki Numao, Kawasaki, both of Japan

[73] Assignee: International Business Machines Corporation, Armonk, N.Y.

[21] Appl. No.: 607,839

[22] Filed: Feb. 27, 1996

Related U.S. Application Data

[63] Continuation of Ser. No. 278,432, Jul. 21, 1994, abandoned.

[30] Foreign Application Priority Data

Jul. 26, 1993 [JP] Japan ..................... 5-184244

[51] Int. Cl.$^6$ .................................................. G06T 17/20
[52] U.S. Cl. ........................................ 345/420; 345/427
[58] Field of Search ................................... 395/119, 120, 395/127, 133

[56] References Cited

U.S. PATENT DOCUMENTS 5,297,241  3/1994  Hirr, Jr. et al. ........................ 395/127

FOREIGN PATENT DOCUMENTS

| | | |
|---|---|---|
| 60-201473 | 10/1985 | Japan . |
| 61-281375 | 12/1986 | Japan . |
| 63-124173 | 5/1988 | Japan . |
| 2-250187 | 5/1990 | Japan . |
| 4-268650 | 4/1994 | Japan . |

OTHER PUBLICATIONS

Potter, C., "Smart Drafting Systems", Computer–Aided Engineering, v8, n2, p. 40 (4), Feb. 1989.

"All the Way with 3D", Computer–Aided Engineering v11, n12, p. 20 (6), Dec. 1992.

"Solid Generation From Orthographic Views Based on Non–Manifold Models and ATMS", H. Masuda et al, Transactions of the Information Processing Society of Japan, Mar. 1994, Japan, vol. 35, No. 3, ISSN 0387-5806, pp. 453–460.

"Unique Construction of Polyhedra From Ambiguous Orthographic Views by Pseudo Boolean Nonlinear Programming", M. Takahashi et al, Journal of Japanese Society For Artificial Intelligence, Nov. 1991, Japan, vol. 5, No. 6, ISSN 0912-8085, pp. 904–911.

"Construction of Solid Model by Orthographic View–Case of Polyhedra", K. Itoh, Information Processing Society of Japan, 1990, Japan, vol. 31, No. 8, ISSN 0447-8053, pp. 1095-1106.

"Restoring to a Polyhedron From Three Orthographic Views by Relaxation Matching Method", T. Horiuchi et al, IEEE Pacific Rim Conference on Communications, Computers and Signal Processing (Cat. No. 93CH3288-8), May 1993, ISBN 0-7803-0971-5, 1993, IEEE, USA pp. 626–629, vol. 2, XP002027617.

Information Processing, vol. 131, No. 8, 1990 by K. Ito, pp. 1095-1106.

*Primary Examiner*—Mark K. Zimmerman
*Attorney, Agent, or Firm*—Volel Emile

[57] ABSTRACT

A solid model is created from a plurality of incomplete drawings. Line segments or curves on each view are calculated from two-dimensional data of a three-view drawing. A wireframe model is created on the basis of the calculated line segments or curves. The wireframe model is corrected by comparing edges of the created wireframe model and the line segments or curves. The corrected wireframe model is converted into a cell-decomposition model. Conditions establishing the line segments or curves as edges of the cell-decomposition model are set by Boolean expressions. A solid model is synthesized on the basis of combinations of cells which are solutions of the expressions. If no solution exists even if the expressions are solved, candidate models are synthesized on the basis of any combination of cells. The synthesized candidate models are displayed in the descending order of the degree of similarity. Alternatively, if a plurality of combinations of cells which are the solutions do exist, a candidate model selected by the operator is determined to be the solid model.

19 Claims, 10 Drawing Sheets

SYSTEM AND METHOD OF CREATING A THREE-DIMENSIONAL SOLID MODEL FROM A PLURALITY OF TWO-DIMENSIONAL DRAWINGS

This is a continuation of application Ser. No. 08/278,432 filed Jul. 21, 1994, now abandoned.

FIELD OF THE INVENTION

This invention relates to a solid model synthesizer and a synthesizing method. More particularly, it relates to a solid model synthesizer and a method for synthesizing a solid model or a three-dimensional model from a plurality of incomplete drawings.

BACKGROUND OF THE INVENTION

The manufacturing industry has carried out design by preparing drawings, and has stored design information in the form of drawings. However, as simulation techniques or numerical control (NC) techniques have advanced, the evaluation of the function of an object to be designed on a computer, or the production of an actual prototype by transferring data to machine tools have come into practice. In such case, two-dimensional drawings are insufficient, and a three-dimensional solid model becomes necessary. Therefore, it has increasingly become more useful to store data representing solids, planes, edges, and vertices in tabular form, and to use three-dimensional models with various functions such as a wireframe presentation function and a surface presentation function.

Much of conventional design information is stored in the form of two-dimensional three-view drawing of front view, side view, and top view. Therefore, it is necessary to produce a solid model from the three-view drawing holding the design information. However, production of the solid model is time and labor intensive. Therefore, various studies have been conducted on methods for producing solid models from three-view drawings, and various solid model production devices such as discussed below have been provided.

That is, a three-view drawing input apparatus for preparing a three-dimensional configuration drawing by inputting the coordinate data of three two-dimensional drawings consisting of a front view, a plan view, and a side view has been provided which includes a cell control means for dividing a drawing preparation area into square cells of a predetermined size dependent on the two-dimensional density to be input, and a radiated point displaying means for displaying projected points of characteristic points, which consist of intersections, break points, and junctions of the three two-dimensional drawings, parallel to axes of coordinates shared when inputting one of the three two-dimensional drawings (Japanese PUPA No. 60-201473). In addition, as technique in a system such as that for CAD or CG for displaying a three-dimensional image in two forms of a wireframe model and surface model, an apparatus has been provided which simultaneously generates line and plane data by associating them to each input point (Japanese PUPA No. 63-124173). Moreover, an apparatus has been provided which extracts sections where edges linearly continue, and determines the truth or falsity of inflection points in a section through presence or absence of corresponding edges on other drawings (Japanese PUPA No. 2-250187). Furthermore, a solid model synthesizer for inputting the configuration of a solid model in the form of three-view drawings and for synthesizing the solid model from these three-view drawings has been provided which includes a means for obtaining from two-dimensional data representing vertices and lines of a graphic form given by these three-view drawings three-dimensional data for three-dimensional lines forming a three-dimensional wireframe corresponding to the graphic form, a means for dividing each area defined by a plurality of the three-dimensional lines into cells with boundaries and volume, a means for holding each of the divided resultant cells as non-polygonal data structure, a means for evaluating the existence of inconsistencies between neighboring cells by referring to these three-view drawings, and a means for synthesizing a solid model by incorporating each cell based on the combination of cells without inconsistency (Japanese PUPA No. 4-268650).

A basic method for synthesizing a solid model carried out by the above-mentioned solid model synthesizer uses an approach proposed by configuration of a solid model by using three drawings (Information Processing, Vol. 131, No. 8, K. Ito, 1990). This approach first inputs data of three drawings, and synthesizes three-dimensional candidate vertices by selecting a combination of vertices, which may possibly become vertices on the three-dimensional coordinates, from each vertex on the three drawings. If a projection of a line connecting any two candidate vertices appears in all of the three-view drawings as vertices and lines, and there is no other candidate between two candidate vertices, then the line is held as a candidate edge. Then, a plane which does not contain any other candidate edge therein is held as a candidate plane. Here, candidate vertices and candidate edges such as isolated points or hanging edges which are inconsistent as components of a solid model are removed by using knowledge on a three-dimensional configuration such as "all candidate and candidate edges are on a boundary of a candidate plane." Then, an aggregate of candidate planes which may become a boundary of the solid model is searched. Because a solid model has a constraint as "all edges are shared by only two planes, and a component does not intersect any point other than a boundary," all aggregates satisfying this condition are found, and the found aggregates of the planes become the solid model.

SUMMARY OF THE INVENTION

To cause a solid model to be found by the above-mentioned various solid model synthesizing methods and synthesizers, it is a prerequisite that the three-view drawing to be input be complete. If there is any error in the three-view drawing, it is impossible to find the solid model. To find the solid model in such a case, it is necessary to detect and correct the area with the error. As an approach for it, if there is any missing edge when edges are held as the above-mentioned candidate edges, it is arranged to interactively compensate for the missing edge.

However, in such an approach of interactively compensating for the edge, because the work for detecting that error takes much time and trouble, and errors being detected are limited to simple ones which a human operator can easily find, there is such a problem that it is impossible to reliably find a desired solid model from an incomplete three-view drawing.

Then, in view of the above-mentioned fact, this invention is intended to provide a solid model synthesizer and a synthesizing method of finding a solid model from an incomplete three-view drawing.

A solid model is created from a plurality of incomplete drawings. Line segments or curves on each view are calculated from the two-dimensional data of a three-view drawing. A wireframe model is created on the basis of the calculated line segments or curves. The wireframe model is corrected by comparing edges of the created wireframe model and the line segments or curves. The corrected wireframe model is converted into a cell-decomposition model. Conditions for at least one of the three-view drawing to be correct are set by Boolean expressions. A solid model is synthesized on the basis of combinations of cells which are solutions of the expressions. If no solution exists even if the expressions are solved, candidate models are synthesized on the basis of any combination of cells. The synthesized candidate models are displayed in the descending order of the degree of similarity. Alternatively, if a plurality of combinations of cells which are the solutions do exist, a candidate model selected by the operator is determined to be the solid model. A three-view drawing for the obtained solid model is newly prepared, and the original three-view drawing is made complete on the basis of the newly prepared three-view drawings.

DESCRIPTION OF THE PREFERRED EMBODIMENT

Figure 1:
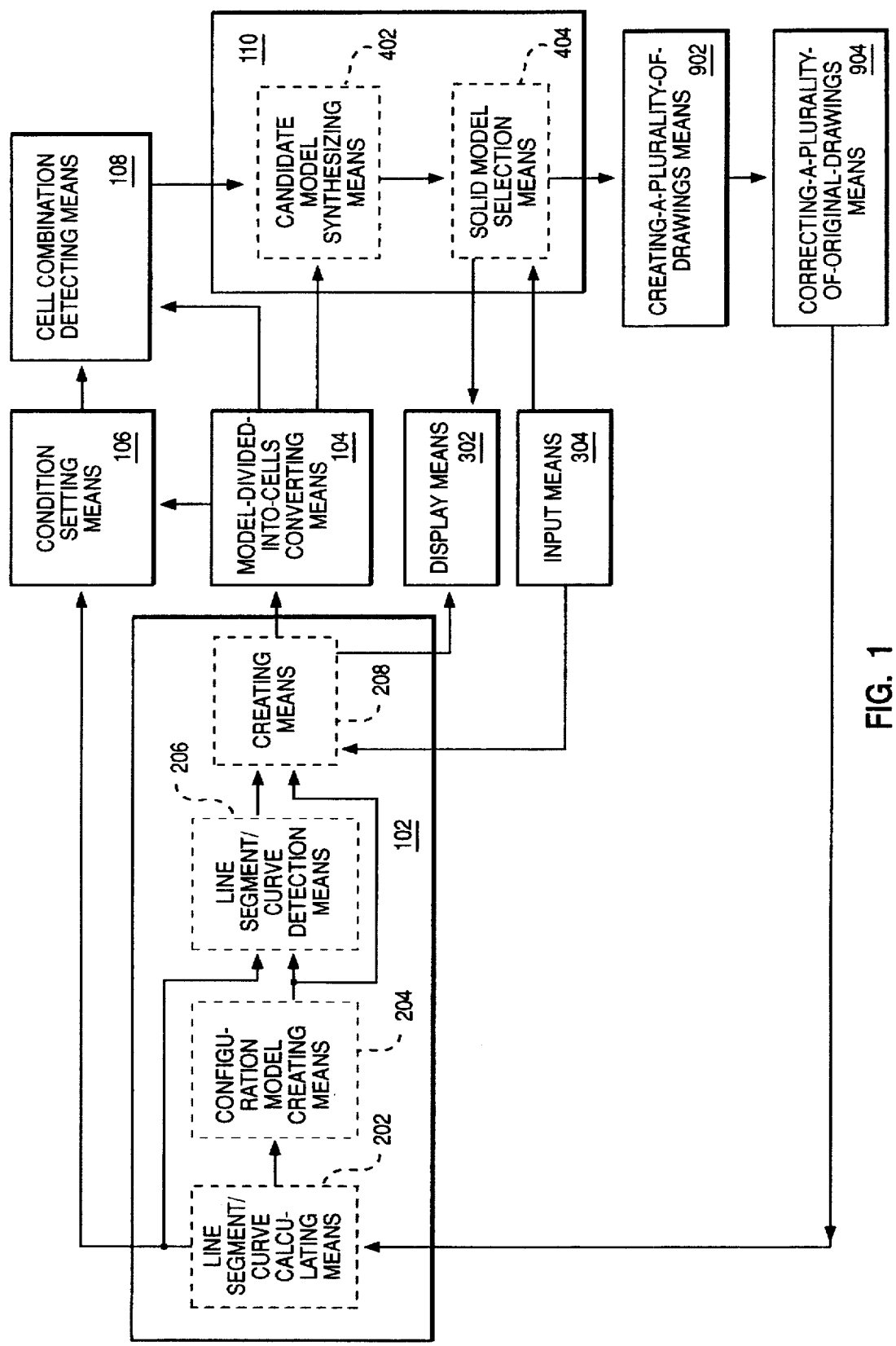
FIG. 1 shows a diagram illustrating requirements for the configuration of the invention.

Now, embodiments of the solid model synthesizer according to this invention will be described in detail by referring to the drawings.

FIG. 1 shows a diagram illustrating requirements for configuration of the invention. In the invention, the wireframe model creating means 102 creates a wireframe model which is formed by a collection of edges and is a three-dimensional configuration model, on the basis of line segments or curves of a plurality of drawings prepared by a solid being projected onto a plurality of mutually perpendicular planes. The cell-decomposition model converting means 104 defines cells, which are respectively regions specified by said edges which, respectively, have a boundary surface and volume, in said created wireframe model, and converts the wireframe model into a cell-decomposition model which is an aggregate of cells. The condition setting means 106 sets conditions, on the basis of corresponding relationships between said line segments and said edges of said cell-decomposition model, so that at least one of said plurality of the drawings becomes correct. The cell combination detecting means 108 detects combinations of said cells which satisfy said conditions. The solid model creating means 110 creates, on the basis of the result of said detection, a solid model which is formed by the combination of said cells and which is a model of said solid.

Thus, because the solid model which is a model of a solid is created by setting conditions which make at least one of the plurality of drawings correct, and by being based on a combination of cells which satisfies these conditions, the solid model can be created when at least one drawing is correct even if all the other drawings are incomplete, so that time and labor for creating the solid model can be significantly reduced.

The line segment/curve calculating means 202 of the invention calculates from two-dimensional data of a plurality of drawings prepared by a solid being projected onto a plurality of mutually perpendicular planes, line segments or curves, which are components of each drawing. The configuration model creating means 204 is for creating a three-dimensional configuration model, which consists of a collection of edges, on the basis of said calculated line segments or curves. The line segment/curve detection means 206 detects line segments or curves, which are not used as edges of said three-dimensional configuration model, by comparing edges constituting said created three-dimensional configuration model with line segments or curves on said plurality of drawings. The creating means 208 creates a wireframe model on the basis of the detection result of said line segment/curve detection means 206 and said three-dimensional configuration model.

Thus, because the invention detects line segments or curves in a plurality of drawings, which are not used as the edges of a wireframe model, and creates said wireframe model on the basis of the detected line segments or curves and said three-dimensional configuration model, error detection is very easily and accurately performed on the plurality of drawings and to create an accurate wireframe model, both of which have taken enormous amount of time and labor.

The creating means 208 in the invention causes the display means 302 to display the result of detection by said line segment/curve detection means 206, and creates a wire model on the basis of line segments or curves for correcting said plurality of drawings input from the input means 304 by an operator or the like, or edges for correcting said three-dimensional configuration model and said configuration model.

Thus, because the invention displays the result of detection, it is easy to determine where the configuration model should be corrected. In addition, because the wireframe model is corrected on the basis of the data input by an operator or the like, complicated calculations can be omitted.

The candidate synthesizing means 402 in the invention synthesizes candidate models, which are candidates of the solid model, on the basis of said combination of cells. The solid model selection means 404 selects one of said candidates as the solid model.

Thus, because one of the candidate models is selected as the solid model, a desired solid model can be obtained even if a plurality of combinations of cells satisfying the conditions are found.

The candidate model synthesizing means 402 synthesizes candidate models on the basis of any combination of cells if the combination of cells satisfying said conditions is not detected.

Thus, because, if a combination of cells satisfying the conditions is not found, that is, even if the plurality of drawings are inconsistent with each other, the candidate models are created on the basis of any combination of cells, and one candidate model is selected from these created candidate models as the solid model, a desired solid model can be easily obtained.

The degree of similarity calculation means 602 calculates a degree of similarity between line segments or curves, which are components of drawings prepared by projecting said candidate models onto a plurality of mutually perpendicular planes, and line segments or curves on said plurality of drawings. The solid model selection means 404 selects one of said candidate models as the solid model on the basis of said calculated degree of similarity.

Thus, because, if a plurality of combinations of cells satisfying the conditions are found, or if no combination of cells satisfying the conditions is found, the candidate model is selected as the solid model on the basis of said degree of similarity, a desired solid model can be very easily and rapidly obtained.

The solid model selection means 404 in the invention causes the display means 302 to display said synthesized candidate models, and selects one of the candidate models as the solid model on the basis of the data input from said input means 304 by an operator or the like.

Thus, because the candidate models are displayed, and one of the displayed candidate models is selected as the solid model on the basis of the data input by an operator or the like, complicated calculation can be omitted.

In the invention, said solid model selection means 404 in the invention causes the display means 302 to display said candidate models according to said calculated degree of similarity, and selects one of the candidate models as the solid model on the basis of data input from said input means 304 for identifying one of the candidate models.

Thus, because, if a plurality of combinations of cells satisfying the conditions are found, or if no combination of cells satisfying the conditions is found, the candidate models are displayed on the basis of said degree of similarity, and the solid model is selected on the basis of the data for identifying one of the display candidate models, a desired solid model can be very easily and rapidly obtained, and complicated calculation can be omitted.

The creating-a-plurality-of-drawings means 902 in the invention newly creates a plurality of drawings by projecting said solid model onto a plurality of mutually perpendicular planes. The correcting-a-plurality-of-original-drawings means 904 corrects a plurality of original drawings by comparing said plurality of newly created drawings and the plurality of original drawings so that portions on the plurality of original drawings different from those on the plurality of newly created drawings match those portions on the newly created drawings.

Thus, because drawings corresponding to the synthesized solid model are prepared, and a plurality of prepared drawings are compared with a plurality of original drawings to correct the original drawings so as to match the prepared drawings, it is possible to make the plurality of original drawings to error-free ones.

Figure 2:
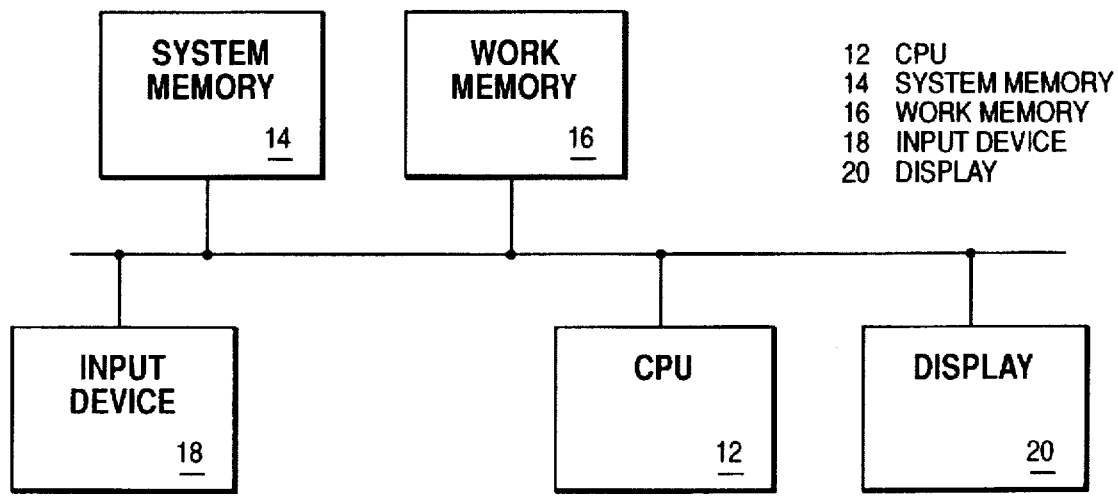
FIG. 2 shows a block diagram illustrating the configuration of the embodiment.

As shown in FIG. 2, a solid model synthesizer 10 comprises a CPU 12, a system memory 14, a work memory 16, an input device 18, and a display 20, all of which are interconnected through a bus. The system memory 14 stores a control routine, which is described later, to be executed by the CPU 12. The work memory 16 stores various data input from the input device 18 which consists of a keyboard or the like such as coordinate data for starting and end points of line segments or curves on three-view drawing.

Figure 4:
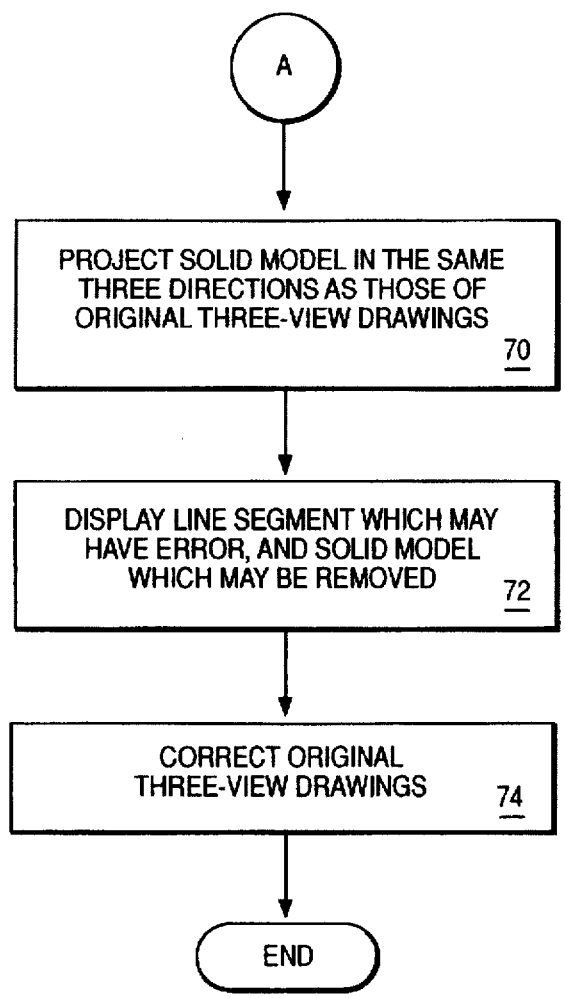
FIG. 4 shows a flowchart illustrating the rest of the main routine of control for the embodiment.
Figure 3:
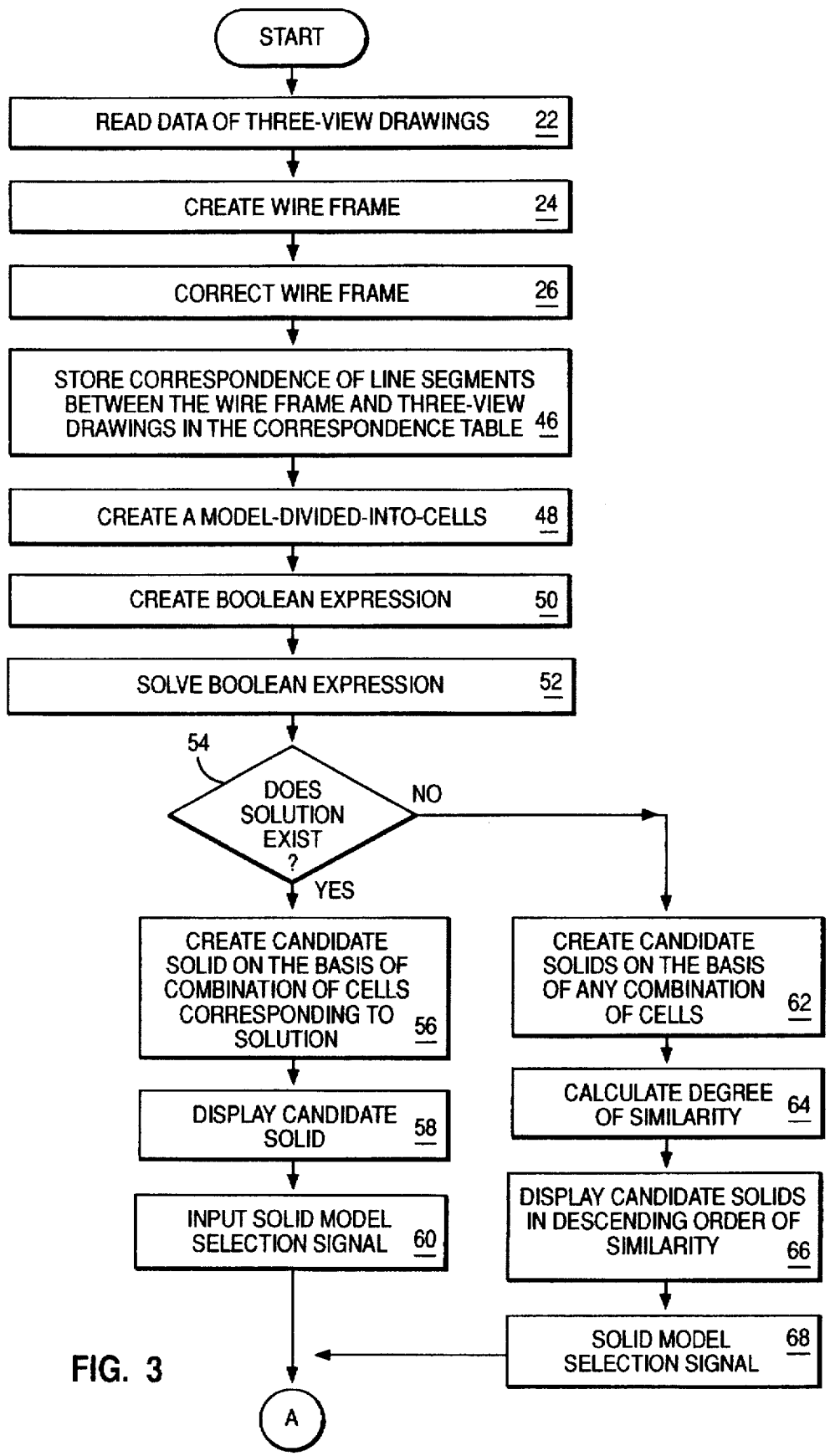
FIG. 3 shows a flowchart illustrating a part of the main control routine for the embodiment.
Figure 5:
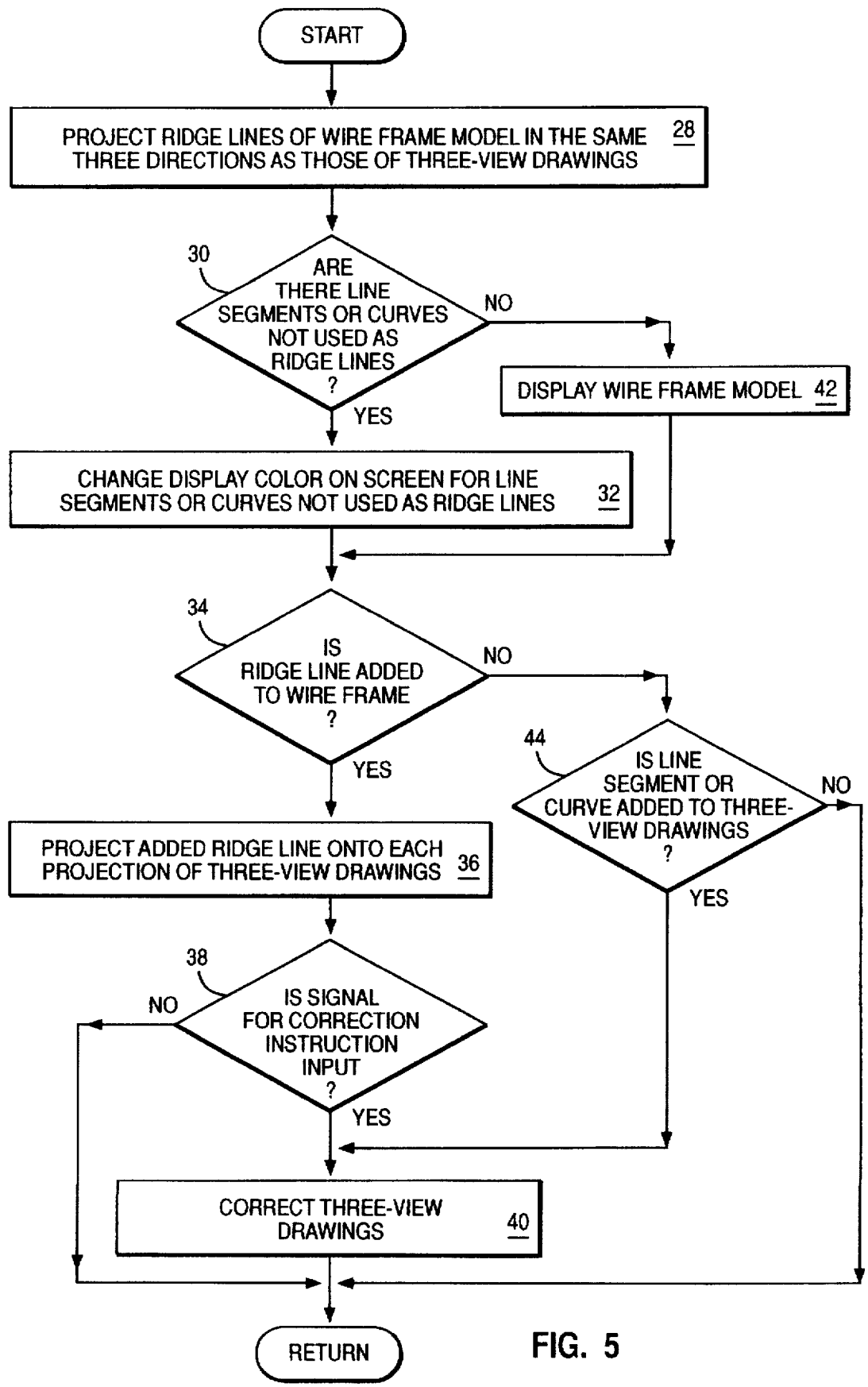
FIG. 5 shows a flowchart illustrating a part of a subroutine of control for correcting a wireframe model of the embodiment.

Then, the operation of this embodiment is described by referring to the control routine shown in FIGS. 3 through 5. First, in a step 22, previously stored coordinate data for starting and end points of line segments or the like on the three-view drawing are read, and in a step 24, a wireframe is created. In the preferred embodiment, the wireframe is created by using the above-mentioned method proposed by configuration of a solid model by using three drawings (Information Processing, Vol. 131, No. 8, K. Ito, 1990). That is, any of the points $v_f(x_f, y_f)$, $v_t(x_t, z_t)$, and $v_s(y_s, z_s)$ are selected from vertices of the front view (X–Y plane), the top view (Z–X plane), and the side view (Y–Z plane). If $x_f=x_t$, $y_f=y_s$, and $z_t=z_s$ are established for the coordinates for each of the selected points, a candidate vertex $(x_i, y_i, z_i)$ which becomes a candidate of vertex of a solid model is determined from these three vertices. Such a combination is found for all vertices. Then, whether or not line segments or the like between the candidate vertices are established as candidate edges which become candidates for the edges of the solid model is examined by investigating whether or not the following conditions (1)–(3) are satisfied:

$$V_{f1}=V_{f2} \text{ or linked } (V_{f1}, V_{f2}) \quad (1)$$

$$V_{t1}=V_{t2} \text{ or linked } (V_{t1}, V_{t2}) \quad (2)$$

$$V_{s1}=V_{s2} \text{ or linked } (V_{s1}, V_{s2}) \quad (3)$$

Here, $V_{f1}$ and $V_{f2}$ indicate two vertices of the front view, $V_{t1}$ and $V_{t2}$ indicate two vertices of the top view, and $V_{s1}$ and $V_{s2}$ indicate two vertices of the side view. The three-dimensional candidate points obtained from them are $P_1$ and $P_2$. In addition, the left conditions in the conditional expressions (1) to (3) such as $V_{f1}=V_{f2}$ indicate a case where the points on the three-view drawing corresponding to the candidate vertices $P_1$ and $P_2$ exist as the single point on one view. This becomes the condition for line segments or the like between the candidate vertices to be established as the edge candidates which will become the candidates for the solid model when the line segment connecting the candidate vertices $P_1$ and $P_2$ is parallel in the Z direction, for example, for a case where the candidate vertices $P_1$ and $P_2$ exist as the single point on the front view (X–Y plane) to satisfy the condition $v_{f1}=v_{f2}$. This is because, as the line segment is parallel in the Z direction as just described, it exists as a single point on the front view when it is projected on the front view. In addition, the right conditions such as linked $(V_{f1}, V_{f2})$ indicate a case where line segments connecting the three-dimensional candidate vertices $P_1$ and $P_2$ exist on one of the three-view drawings. A decision is made whether or not these conditions are satisfied between all three-dimensional candidate points. Line segments or the like between the three-dimensional candidate points satisfying these conditions are held as the candidate edges. Then, those of the candidate edges thus held which cannot become the edges of the solid model are removed. That is, the edge of the solid model always connects to another edge because it is a boundary or an intersecting edge of a plane constituting the boundary of the solid model dividing the space. Then, an edge which does not connect to another edge but only dangles from another edge, in which its end point does not connect to another edge, is not established as a candidate edge and therefore removed. In addition, if three edges or more connect at one end point, this point becomes a vertex of the solid. In this case, an edge connecting to an end point of another edge which is not on the same curve, but on the same curved plane or plane is not established as a candidate edge, and therefore removed. The above processing stores three-dimensional coordinates of both end points of a line in the work memory 16 in a tabular form so that each edge is determined and a wireframe is created in which the skeleton of an object is represented just as a wire-frame.

Figure 6A:
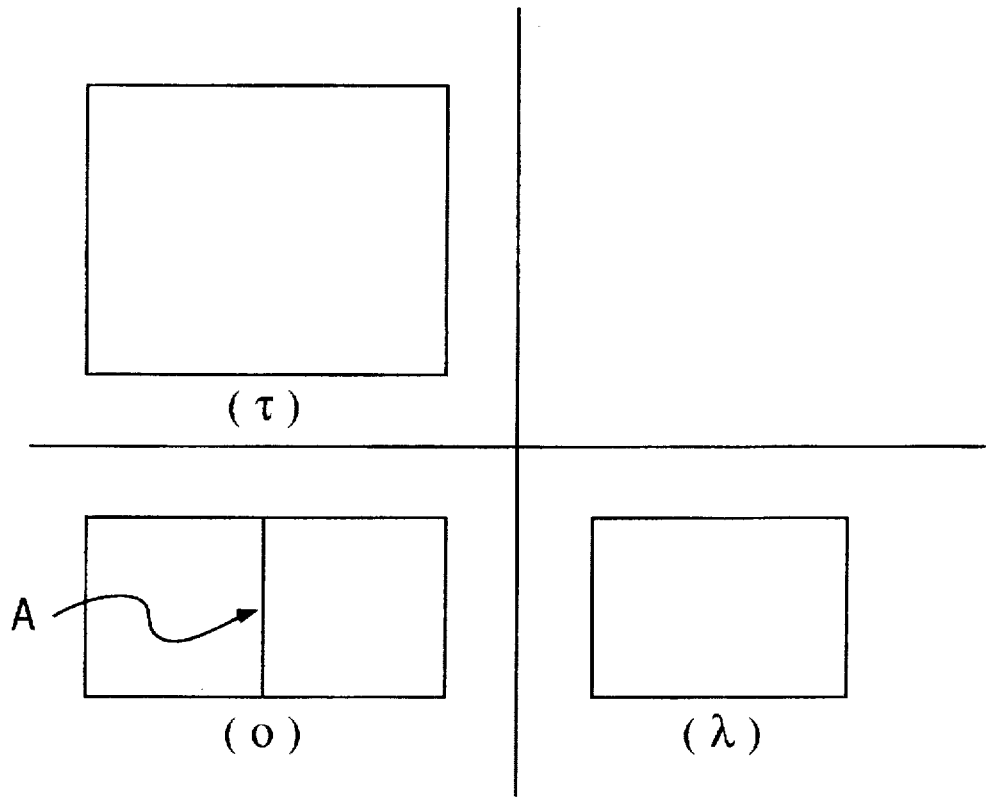
FIG. 6 (a) shows a three-view drawing illustrating line segments or curves not used in a wireframe model, and FIG. 6 (b) shows a wireframe model.
Figure 6B:
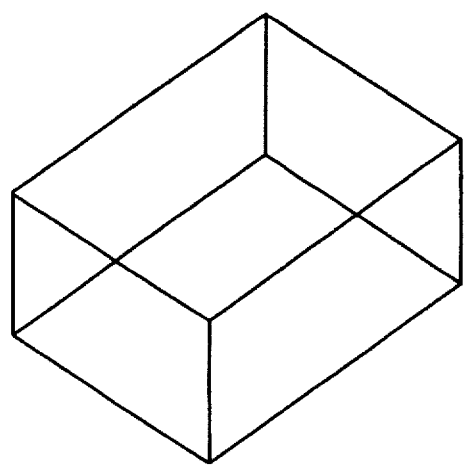
Figure 7A:
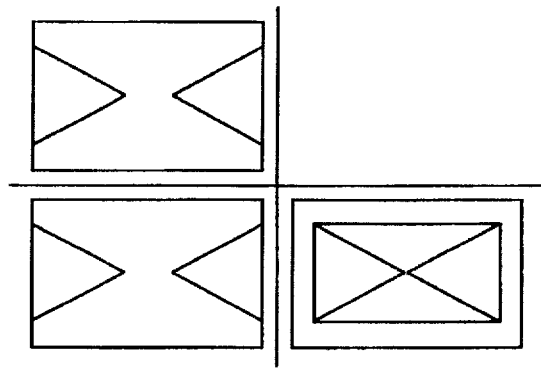
FIGS. 7 (a)–(e) show a process for creating a cell-decomposition model.
Figure 7B:
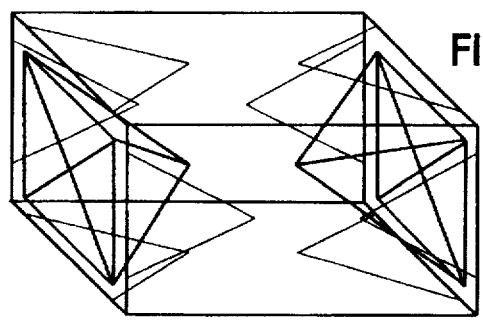
Figure 7C:
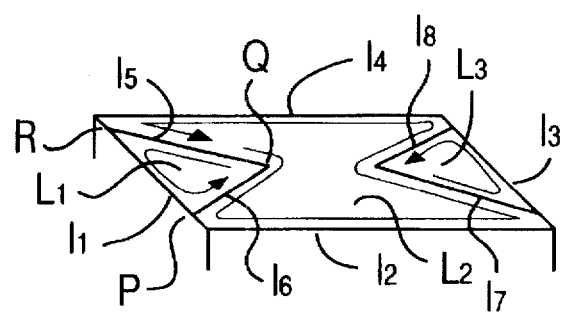
Figure 7D:
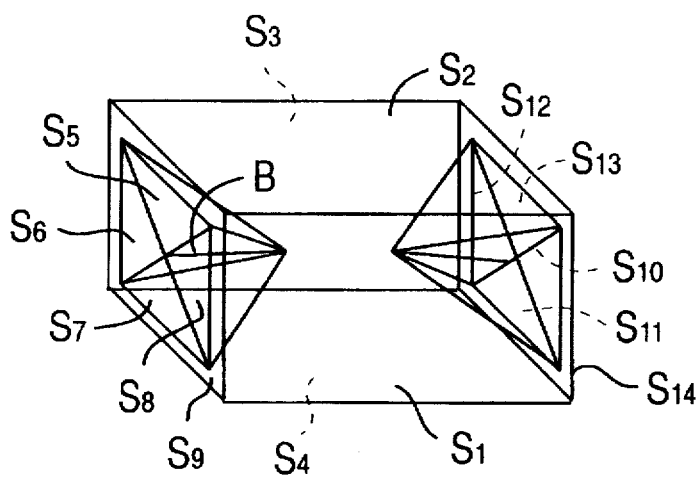
Figure 7E:
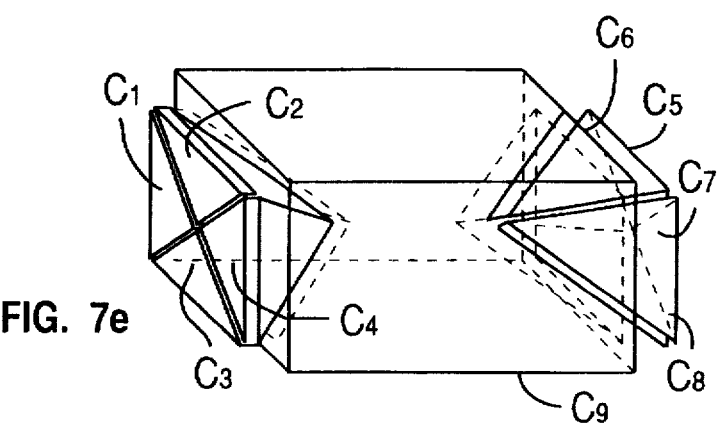
Figure 8A:
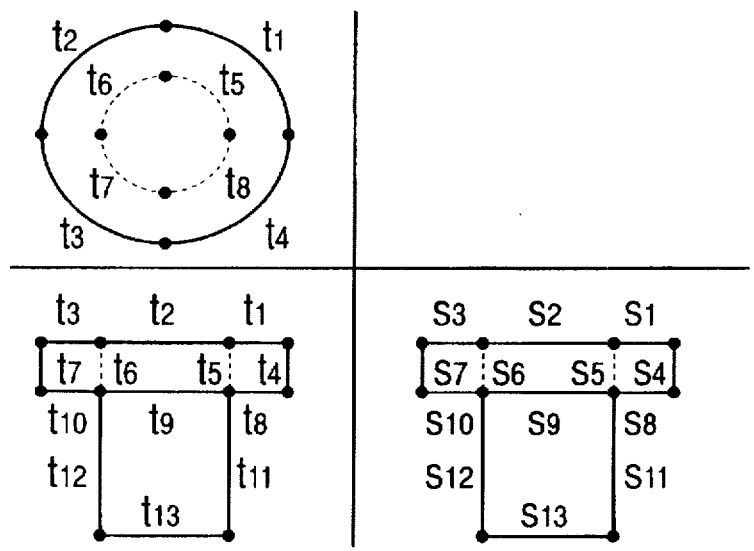
FIGS. 8 (a)–(d) show a process for creating a Boolean expression.
Figure 8B:
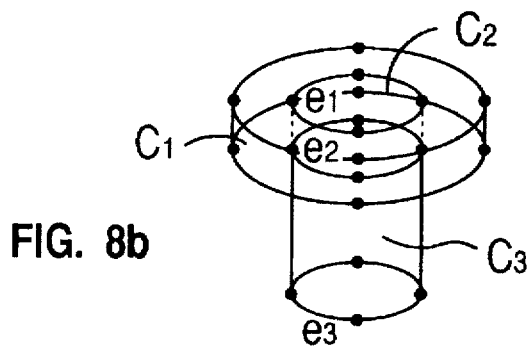
Figure 8C:
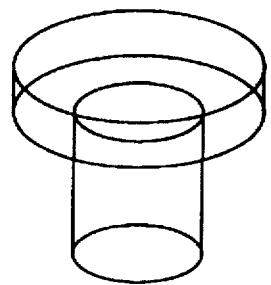
Figure 8D:
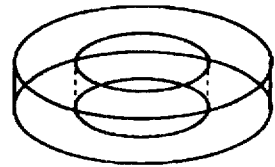

In the next step 26, the wireframe is corrected. This process is for correcting anything missing in the wireframe model. This process is described by referring to a subroutine shown in FIG. 5. First, in a step 28, edges of the wireframe model are projected in the same three directions as those of the three-view drawing. In the next step 30, it is determined whether or not there exist line segments or the like on the three-view drawing which is not used as the edges of the wireframe model. If any exist, the display color on the screen for that line segment or curve is changed in the next step 32, because such line segment or the like may be missing in another view. This is described by referring to FIG. 6. FIG. 6 (a) shows a three-view drawing based on input coordinate data, while FIG. 6 (b) is a wireframe model. When the edges of the wireframe model are compared with line segments on the three-view drawing by projecting them in the same three directions as those of the three-view drawing, it is found that the line segment indicated by an arrow A on FIG. 6 (a) is used as an edge of the wireframe. The line segment indicated by the arrow A may be missing on the other top and side views. Then, all line segments or curves on the three-view drawing which have any possibility of being missing are examined, and have their display color changed to inform the operator that he or she can detect line segments or curves which may be missing on other views and which is difficult to find.

In the next step 34, it is determined whether or not an edge is added to the wireframe. If so, in the next step 36, the added edge is projected to each plane of projection of the three-view drawing for confirmation. In the next step 38, it is determined whether or not a signal for correction instruction is input by the operator. If so, in the next step 40, the original three-view drawing is corrected, and this routine is completed.

Here, it is arranged such that the wireframe is corrected for a line segment or curve which may be missing by adding an edge to the wireframe. However, the method for correcting the wireframe is not limited to such a method. A method of adding a line segment or curve missing on another view to the view may be employed. Then, if an edge is not added to the wireframe in the step 34, it is determined in a step 44 whether or not a line segment or curve is added to the three-view drawing. If so, the three-view drawing is corrected in a step 40. On the other hand, even if there is a line segment or curve present on one view but missing on another view, it may be determined by the operator when he or she refers to the wireframe model that such line segment or curve itself does not need to be present. This routine is then completed if a line segment or curve is not added to the three-view drawing in the step 44.

Moreover, the routine described above assumes a case where a line segment or curve present on a view of the three-view drawing is omitted in being drawn on a corresponding view. However, for example, a case may be considered where even the line segment indicated by the arrow A in FIG. 6 (a) is omitted from the three-view drawing. In such case, there in no inconsistency in correspondence between the wireframe and the three-view drawing, and it is not determined that there exists a missing line segment. However, there may be a case where there has arisen significant omission of line segments or curves in the wireframe model. Then, if it is determined in the step 30 that there exists no line segment not used as an edge of the wireframe model, the wireframe model is displayed in the step 42. Then, when the process enters into the step 34 to carry out the above mentioned processing, the operator examines such significant omission of a line segment or curves on the screen, and corrects the wireframe model by adding a line segment or curve to the original three-view drawing.

For representation of a solid object, it is necessary to determine which sides of the faces are inside or outside of a solid. Then, a cell-decomposition model (FIG. 7 (e)) is created from the surface model (FIG. 7 (d)). That is, first, when a surface obtained in creating the surface model interferes with another surface anywhere other than at an edge, an interference edge indicated by an arrow B in FIG. 7 (d) is created. A three-dimensional closed domain is found by this interference edge or an edge surrounding the boundary of the surface model. A cell is created by defining a volume V determined by the following expression (4) to the found area.

$$V = \sum_{i=1}^{n} (\delta_i \cdot A_i \cdot D_i / 3) \tag{4}$$

where n is the number of faces on the boundary, $A_i$ represents the area of a boundary, $D_i$ represents the distance between a boundary and the origin, and $\delta_i$ represents a sign of the inner product between a normal line $N_i$ of a boundary destined to face outside the domain and a position vector $P_i$ of any point on the boundary.

One with the maximum absolute value of volume in a three-dimensional closed domain determined to have a negative volume is the outermost cell, which has infinite volume, and therefore, removed. Others having negative volume represent cavities. Then, a closed domain with positive volume containing such domain therein is found and made of one three-dimensional cell with cavities. Other closed domains with positive volume are determined to be three-dimensional cells without a cavity. The cells thus created are labeled as $C_1$, $C_2$, $C_3$, ..., etc. When the cells are created as described, as, for example, shown in FIG. 7 (e), a cell-decomposition model is created which consists of four cells $C_1$–$C_4$ on the left side of the solid model, four cells $C_5$–$C_8$ on the right side similar to those on the left side, and a cell $C_9$, to the inside of which the front ends of these cells ($C_1$–$C_8$) reach.

In the next step 46 (FIG. 3), the correspondence of line segments of the wireframe and the three-view drawing is stored in a correspondence table. In the next step 48, a cell-decomposition model is created. Here, the wireframe model only provides the coordinates of edges representing merely the skeleton of the solid, and is incomplete as information representing the solid. Therefore, it may be interpreted as representing another three-dimensional model. It is necessary to further add information for a plane surrounded by this edge to the coordinates of edge representing the skeleton of the solid. Then, a surface model is created from the wireframe model. This is described by referring to FIG. 7. FIG. 7 (a) shows a three-view drawing based on input coordinate data. A wireframe model based on the coordinate data is shown in FIG. 7 (b). The process for creating a surface model from the wireframe model is described. That is, as shown in FIG. 7 (c), loops $L_1$–$L_3$ on the same plane are searched for by following the edges $l_1$–$l_8$ (using a script type on the drawing). In this case, the counterclockwise smallest loops $L_1$–$L_3$ which do not contain other edges in the plane can be obtained by suitably setting a normal line to the plane and sequentially following the nearest edges when viewed clockwise. For example, edge $l_6$, connected to edge $l_1$, which has vertices R and P, and edge $l_5$, which has vertices R and Q, is retrieved by obtaining the sets of coordinates of the vertices (i.e., end points) stored in tabular form. Similarly, $l_1$, $l_2$, $l_3$, $l_4$, $l_5$, $l_7$, and $l_8$ are retrieved. Such retrieval can provide the smallest loop $L_1$ consisting of the edges $l_1$, $l_6$, and $l_5$, $L_2$ consisting of $l_2$, $l_4$, $l_5$, $l_6$, $l_7$, and $l_8$ and $L_3$ consisting of $l_3$, $l_7$, and $l_8$. Faces are defined for thus obtained smallest loops $L_1$–$L_3$. These defined faces are labeled $S_1$, $S_2$, $S_3$, .... Thus, respective information of the vertices, edges and faces of the solid can be obtained in tabular form. Then, by adding the defined face on the same plane and the faces on another plane by calculus of classes, for example, in the case of FIG. 7 (d), and the face $S_1$ is defined for the front side of the three-dimensional model, the face $S_2$ for the top side, and the faces $S_3$ and $S_4$ for the planes opposite to each corresponding face. Then, five faces ($S_5$–$S_9$) are defined on the left side, five faces ($S_{10}$–$S_{14}$) on the right side, and eight faces within the solid (on the left and the right sides). Thus, a face model defined with 22 faces is created.

In the next step 50, conditions making at least one view of the three views correct are created as Boolean expressions. That is, cells to be selected are found by solving Boolean expressions in order that a projection of the solid model matches at least one view of the three views. The procedure for creating the Boolean expressions is described by referring to FIG. 8. FIG. 8 (a) shows a three-view drawing with errors based on input two-dimensional coordinate data. In the figure, $t_i$, $f_i$, and $s_i$ represent a line segment or curve on the top, the front, and the side views, respectively. As shown in FIG. 8 (a), the top view consists of eight curves, the front view consists of 13 line segments, and the side view also consists of 13 line segments. FIG. 8 (b) shows a cell-decomposition model, in which $e_i$ represents an edge, while $C_i$ represents a cell. Here, the top view (TOP), the front view (FRONT), and the side view (SIDE) are expressed as follows in the relationship with line segments and curves:

$$\text{TOP} = \{t_1, t_2, \ldots t_8\} \quad (5)$$

$$\text{FRONT} = \{f_1, f_2, \ldots f_{13}\} \quad (6)$$

$$\text{SIDE} = \{s_1, s_2, \ldots s_{13}\} \quad (7)$$

Here, it is assumed that $t_i$, $f_i$, and $s_i$ are binary variables, each of which is true when the line segment or curve is contained in the projection of a candidate model which is a three-dimensional model to be a candidate of the solid model, and false otherwise. In this case, the condition wherein, for example, the top view of the three-view drawing is correct is the case where all of $t_1$, $t_2$, . . . $t_8$ are established as the edges of the candidate model. Therefore, the condition wherein at least one view of the three-view drawing is correct is the case where all of line segments or curves in at least one view of the top view (TOP), the front view (FRONT), and the side view (SIDE) are established as the edges of the candidate model. In addition, the case where all line segments or curves of one view are established as the edges of the candidate model is the case where at least one of the aggregates of edges of the cell-decomposition model $\{e_i\}$ is established as the edge of the candidate model. This is studied for the line segment $f_6$ in the front view in FIG. 8 (a). Edges on the projection of the cell-decomposition model corresponding to the line segment $f_6$ are three, $e_1$, $e_2$, and $e_3$, as shown in FIG. 8 (b). Therefore, the conditions for the line segment $f_6$ to be established as an edge of the candidate are the case where at least one of the edges $e_1$, $e_2$, and $e_3$ of the cell-decomposition model becomes the edge of the candidate solid. Then, the conditions are considered as to where the edge $e_2$ becomes the edge of the candidate model. Cells adjacent to this edge $e_2$ are $C_1$, $C_2$, and $C_3$ as shown in FIG. 8 (b). Possible combinations of these cells are eight as shown in the Equation 1 below.

[Equation 1]

$$(C_1 \, C_2 \, C_3), (\overline{C}_1 \, C_2 \, C_3), (C_1 \, \overline{C}_2 \, C_3), (C_1 \, C_2 \, \overline{C}_3), (\overline{C}_1 \, \overline{C}_2 \, C_3), (\overline{C}_1 \, C_2 \, \overline{C}_3), (C_1 \, \overline{C}_2 \, \overline{C}_3), (\overline{C}_1 \, \overline{C}_2 \, \overline{C}_3)$$

Here, the representation indicated by the following Equation 2 means not to select the cell $C_i$.

[Equation 2]

$$\overline{C}_i$$

Here, the third combination does not satisfy the conditions of the solid model that all edges should be shared by two faces, because edge $e_2$ is shared by four faces. The second and fourth combinations of cells do not have the edge $e_2$, while the eighth combination does not select any cell so that the solid itself does not exist. Therefore, among the eight combinations in the Equation 1, the edge $e_2$ appears as the edge of the candidate model in four combinations of the first, fifth, sixth, and seventh ones. Thus, because any one of four combinations of the first, fifth, sixth, and seventh ones satisfies the condition that the edge $e_2$ becomes the edge of the candidate model, $e_2$ can be expressed as the following Equation 3.

[Equation 3]

$$e_2 = C_1 \, C_2 \, C_3 \cup \overline{C}_1 \, \overline{C}_2 \, C_3 \cup \overline{C}_1 \, C_2 \, \overline{C}_3 \cup C_1 \, \overline{C}_2 \, \overline{C}_3$$

Moreover, because the cells adjacent to each of edges $e_1$ and $e_3$ are $\{C_1, C_2\}$ and $\{C_3\}$, when relational expressions are similarly found for the edges $e_1$ and $e_3$, they are as represented by the following Equation 4.

[Equation 4]

$$e_1 = \overline{C}_1 \, C_2 \cup C_1 \, \overline{C}_2$$

$$e_3 = C_3$$

Thus, because the line segment of line segment $f_6$ on the three-view drawing becomes true if any on the edges $e_1$, $e_2$, and $e_3$ is the edge of the candidate model, the condition can be expressed as represented by the following Equation 5.

[Equation 5]

$$f_6 = e_1 \cup e_2 \cup e_3$$
$$f_6 = (\overline{C}_1 C_2 C_3 \cup \overline{C}_1 \overline{C}_2 C_3 \cup \overline{C}_1 C_2 \overline{C}_3 \cup C_1 \overline{C}_2 \overline{C}_3) \cup (\overline{C}_1 C_2 \cup C_1 \overline{C}_2) \cup C_3$$
$$f_6 = \overline{C}_1 C_2 \cup C_1 \overline{C}_2 \, C_3$$

All combinations of cells in which such line segment or curve on the three-view drawing is established as an edge of the candidate model are found for all line segments or curves on the three-view drawing. Then, when all the conditions are satisfied, it is possible to find the conditions where all views of the three-view drawing are correct as the combinations of cells. For example, the example of FIG. 8 is as represented by the following Equation 6.

[Equation 6]

$$TOP = C_1C_2C_3 \cup C_1\bar{C}_2\bar{C}_3$$
$$FRONT = \phi$$
$$SIDE = \phi$$

Therefore, the condition where at least one view of the three-view drawing is correct is as represented by the following Equation 7 because it is sufficient that any one view of the three-view drawing be correct.

[Equation 7]

$$TOP \cup FRONT \cup SIDE = C_1\ C_2\ C_3\ \cup C_1\ \bar{C}_2\ \bar{C}_3$$

Candidate models satisfying these conditions become candidate models based on these two combinations of cells. The candidate models corresponding to the combination of cells in the left are the candidate models in FIG. 8 (c) (1) created by synthesizing all cells. On the other hand, the one based on the combination of cells in the right is the candidate model in FIG. 8 (c) (2) of only the cell $C_1$ without selecting the cells $C_2$ and $C_3$.

In this embodiment, the above logical expression is solved by using an inference system. Generally, the Boolean expressions input to the inference system are as follows:

1. Projections constituting the three-view drawing:
TOP∪FRONT∪SIDE=true

2. Relationships between the three-view drawing and line segments or curves:
TOP=$t_1$-$t_2$- ... $t_A$
FRONT=$f_1$-$f_2$- ... $f_m$
SIDE=$s_1$-$s_2$- ... $s_n$ 3. Conditions where the interference edge e does not appear:
e=false 4. Correspondence between line segments or curves on the three-view drawing and the cell-decomposition model:
$t_1$=$e_1 \cup e_2 \cup$ ... , $t_2$= ... , $t_1$= ...
$f_1$= ... , $f_2$= ... , $f_m$= ...
$s_1$= ... , $s_2$= ... , $s_n$= ...

5. Condition where an edge of the cell-decomposition model appears on the candidate model:
$e_1$=$C_1 \cup C_2$, $e_2$= ...

Figure 9A:
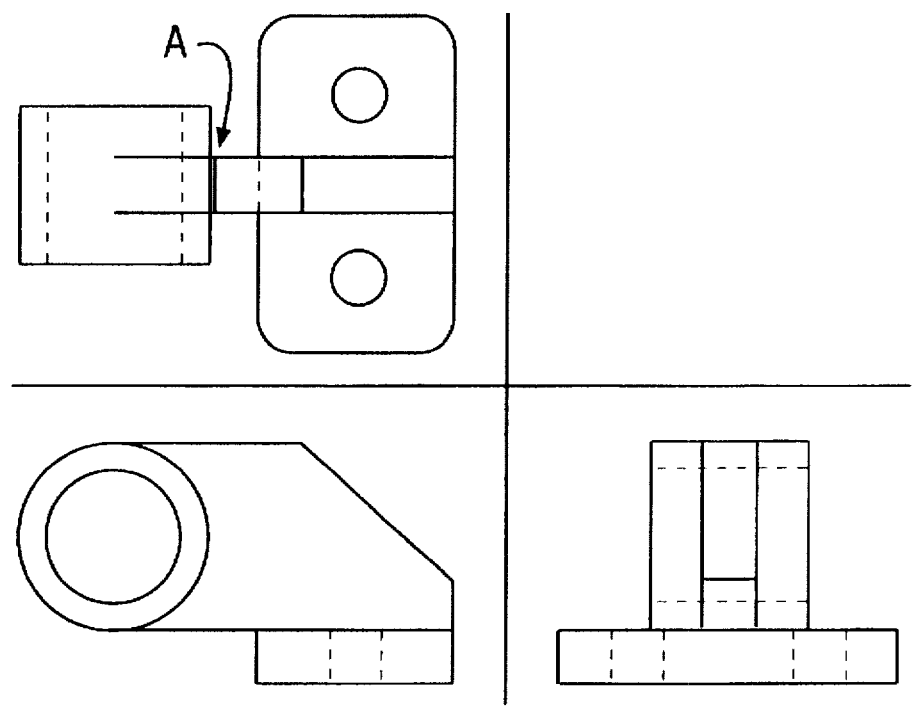
FIG. 9 (a) shows a three-view drawing the top view of which is incorrect, and FIG. 9 (b) shows a candidate model when the three-view drawing of (a) are input.
Figure 9B:
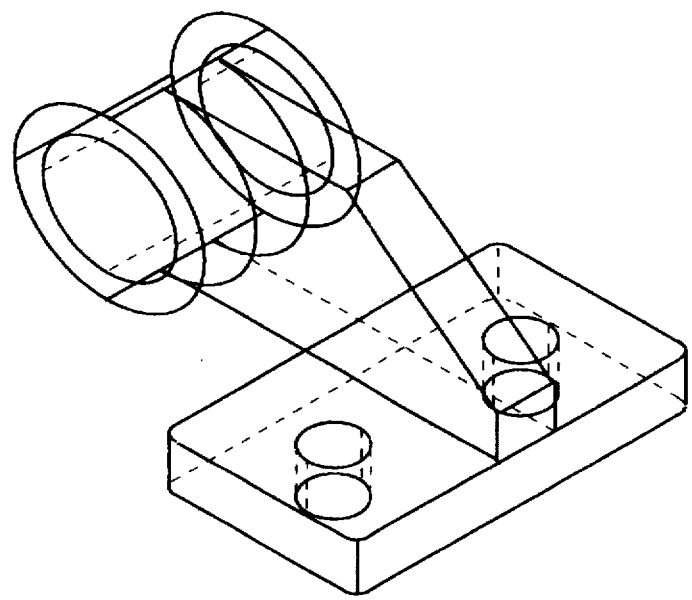
Figure 10A:
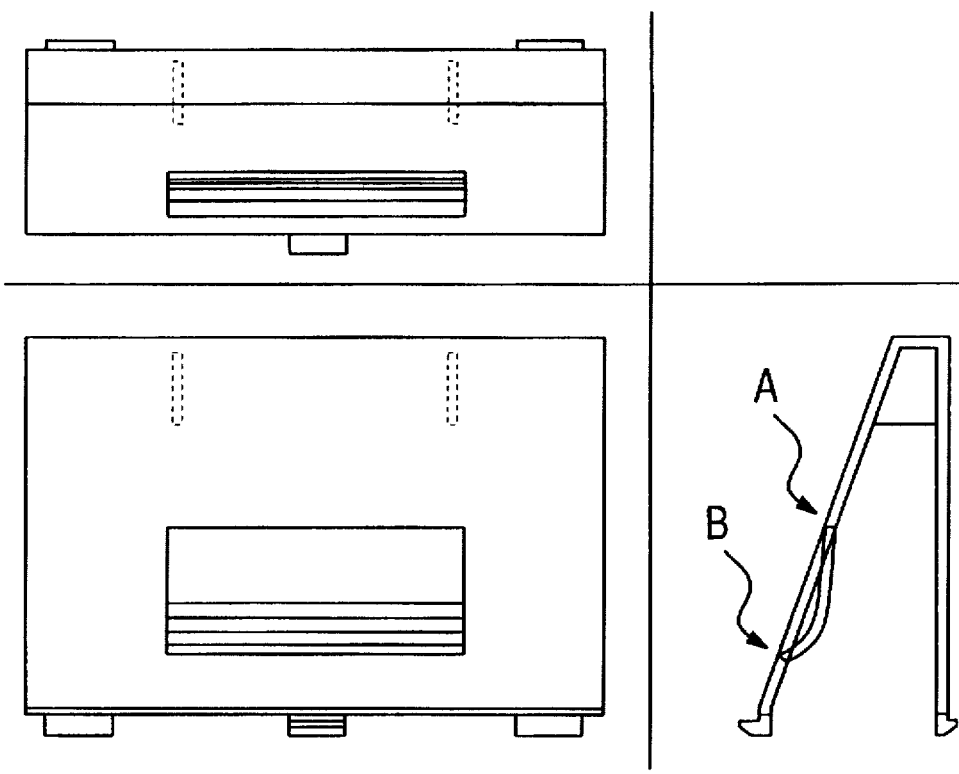
FIG. 10 (a) shows three-view drawing the side view of which is incorrect, and FIG. 10 (b) shows a candidate model when the three-view drawing of (a) are input.
Figure 10B:
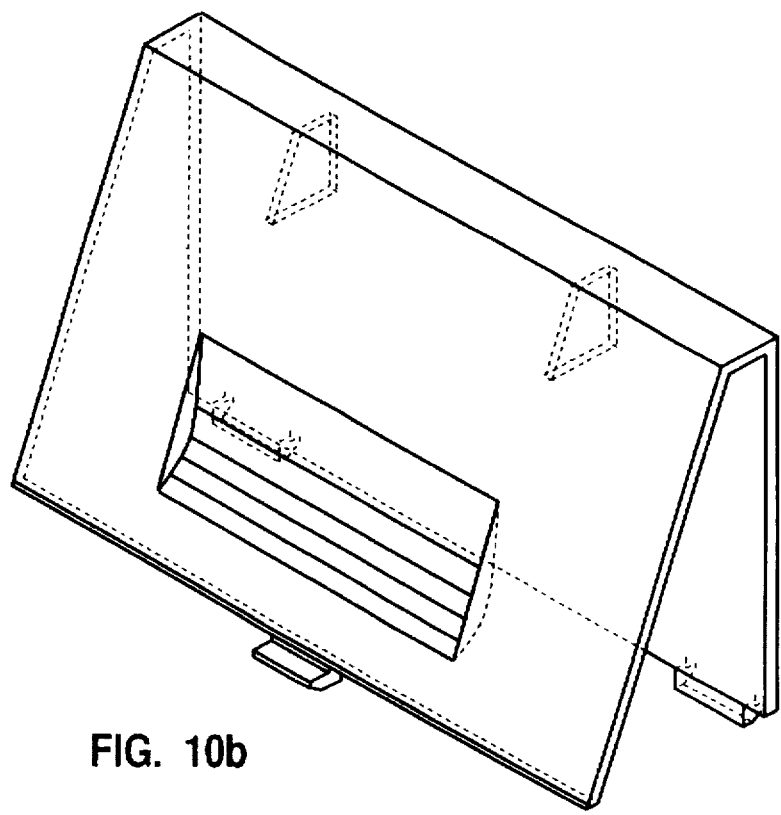
Figure 11A:
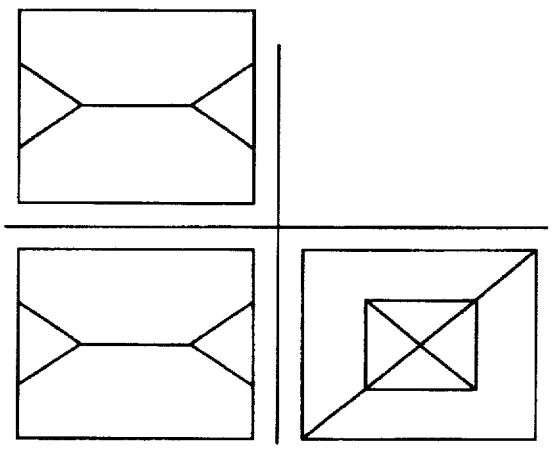
FIGS. 11 (a)–(e) show candidate models when all three views are incorrect, and line segments or curves of their three-view drawing which may have errors and which are characterized and displayed.
Figure 11B:
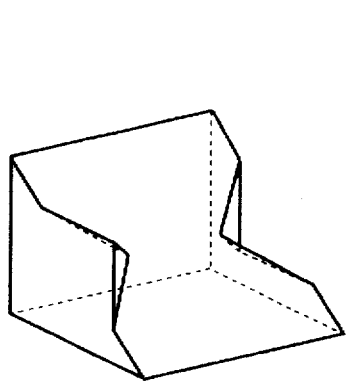
Figure 11C:
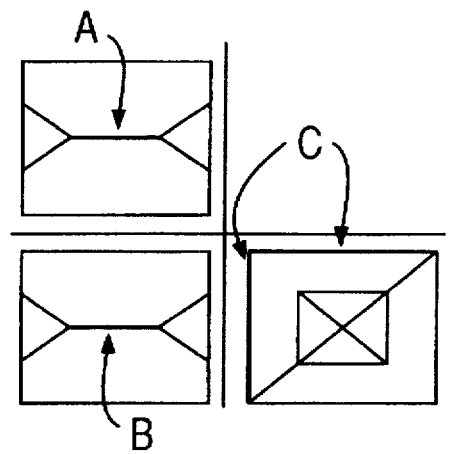
Figure 11D:
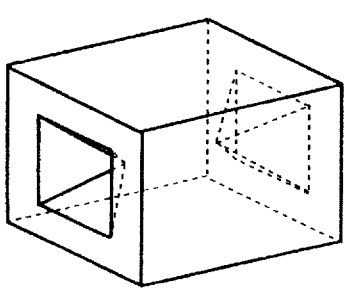
Figure 11E:
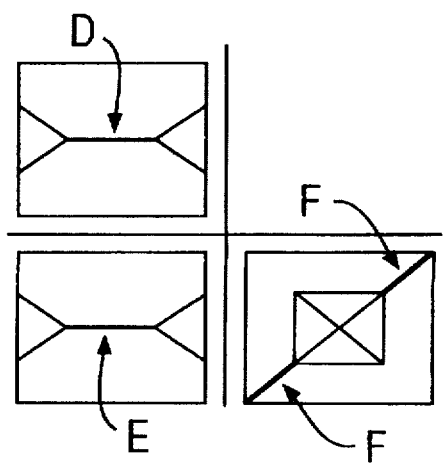

In the next step 52, combinations of cells satisfying the conditions 1–5 can be found by solving the above Boolean expressions with the inference system. The models of solids identified by the combinations of cells are candidates for the solid model to be found. In the next step 54, it is determined whether or not there is a solution when the Boolean expressions are solved. If so, the process proceeds to a step 56 where candidates determined by the combinations of cells satisfying the conditions are created. In this case, because any one view of the three-view drawing has an error, line segments or curves which may be erroneous are displayed with some characteristics in the next step 58, and a solid model is displayed which is created by removing these line segments or curves. This is described by referring to FIGS. 9 and 10. FIG. 9 (a) shows three-view drawing based on two-dimensional coordinate data, while FIG. 9 (b) shows a solid model created on the basis of combinations of cells obtained by solving the Boolean expressions. In FIG. 9 (a).

shown by a thick line as indicated by an error A is a different portion between the drawings prepared by projecting the created solid model in the same three directions as those of the three-view drawing and the original drawings. In addition, FIG. 10 (a) shows a three-view drawing based on two-dimensional data, while FIG. 10 (b) shows a solid model created on the basis of combinations of cells obtained by solving the Boolean expressions. In FIG. 10 (a), shown by thick lines as indicated by arrows A and B, are different portions between the drawings prepared by projecting the created solid model in the same three directions as those of the three-view drawing and the original drawings. If there are multiple candidate models as in FIG. 8 (c), they are sequentially displayed. In the next step 60, a solid model is selected from such multiple candidate models by the operator, who inputs its selection signal.

On the other hand, if it is determined by solving the Boolean expressions that there is no solution, that is, if all views of the three-view drawing have errors, a candidate model consisting of any of the above-mentioned combination of cells is created in a step 62. In the next step 64, the candidate model is compared with the original three-view drawing by projecting it in the same three directions as those of the original three-view drawing to find the degree of similarity dif (V, $M_b$) between the projection $M_b$ of this candidate model and the original three-view drawing V. The degree of similarity dif (V, $M_b$) means sum of the number of edges N1 of the three-view drawing not appearing on the candidate model and the number of edges N2 of the candidate model not appearing on the three-view drawing. If there are n cells, there are $2^n$ combinations of cells. For example, if there are three cells as shown in FIG. 8, combinations of cells include a case where all cells are selected, a case where one or two cells are selected, and a case where no cell is selected. Then, adding all of them provides $2^3$, or eight, combinations. These $2^n$ combinations include a case where no cell is selected, which is a combination of cells in which the three-dimensional model itself does not exist. Therefore, there are $2^n-1$ candidate models. The degree of similarity between the projection of candidate model and the original three-view drawing is found for the $2^n-1$ candidate models. Then, in the next step 66, line segments or curves on the three-view drawing which may have errors are displayed with characteristics on the three-view drawing in the descending order of the degree of similarity, and the candidate models are displayed. The steps 64 and 66 are described by referring to FIG. 11. FIG. 11 (a) shows a three-view drawing, all views of which have arrows, while FIG. 11 (b) (1) shows a candidate model synthesized on the basis of any combination of cells. It is possible to recognize errors on the three-view drawing by projecting this candidate model in the same three directions as those of the three-view drawing. FIG. 11 (b) (2) shows those erroneous portions characterized by thick lines. That is, they are determined to be errors and indicated in thick lines as center line segments A and B on the front and the top views, and as two line segments C perpendicularly crossing at the upper left vertex on the side view. In this case, the number of edges N1 on the three-view drawing not appearing on the candidate model is four, the number of edges N2 on the candidate model not appearing on the three-view drawing is zero, and the degree of similarity dif (V, $M_b$) is 4. In addition, FIG. 11 (c) (3) shows a candidate model created by a combination of cells different from FIG. 11 (b) (1). By projecting this candidate model in the same three directions as those of the three-view drawing (FIG. 11 (a)), similar to FIG. 11 (b), as shown in FIG. 11 (c) (4), central line segments D and E on the front and the top views, and two line segments from the lower left vertex to the upper right vertex or curves F on the side view are determined to be errors and displayed in thick lines. In this case, the number of edges N1 on the three-view drawing not appearing on the candidate model is four, the number of edges N2 not appearing on the three-view drawing is zero, and the degree of similarity dif (V, $M_b$) is four.

In the next step 68, the operator selects a desired candidate model from the plurality of candidate models which are displayed in the descending order of the degree of similarity, that is, a candidate with the degree of similarity equal to or higher than a predetermined value, which is, in this embodiment, a candidate model with the largest degree of similarity, as the solid model, and inputs its selection signal.

The solid model selected by the operator is projected in the same three directions as those of the three-view drawing in the next step 70. In the next step 72, each of the projected three-dimensional configurations is compared with the three-view drawing to display line segments or curves, which may have errors, together with the three-view drawing, and a solid model which is created by removing such line segments or curves. In the next step 74, the original three-view drawing is corrected to make a three-view drawing based on coordinate data input after removing the erroneous line segments or curves, and to complete this control.

According to the embodiments described above, because the condition for at least one view of the three-view drawing to be correct is set, and a solid model is synthesized on the basis of a combination of cells satisfying this condition, when at least one view is correct, a solid model can be synthesized even if other views are not correct so that the time and labor for creating the solid model can be significantly reduced.

Moreover, because line segments or curves on several views not used on a wireframe model are detected, the detected line segments or curves are displayed together with several views, and the wireframe is corrected based on the input edges of the wireframe model, or the line segments or curves on several views input, detection and correction of errors on several views, which have previously been very complicated, can be very easily and reliably conducted.

Furthermore, because, even if the views of a three-view drawing have no inconsistencies with each other, but the wireframe model has significant missing line segments or curves, the wireframe model is corrected on the basis of the edges of the wireframe model input by the operator, or the line segments or curves on several views input by the operator, errors on several views can be easily and reliably detected and corrected.

In addition, because, if all three views have errors, candidate models synthesized based on a combination of cells are displayed in the descending order of the degree of similarity, and one of the displayed candidate models is selected as the solid model, a desired solid model can be rapidly obtained even if all three views have errors.

In addition, because drawings corresponding to a synthesized solid model are prepared, and the original three-view drawing is corrected so as to match the prepared drawings by comparing the prepared several views with the original several views, the original three-view drawing with errors can be made a complete three-view drawing.

Although the above-mentioned embodiment is described for an example where a solid model is synthesized from an incomplete three-view drawing, it is not limited to such a case, but can be applied to a plurality of incomplete drawings.

As described above, the solid model synthesizer and method for synthesizing according to this invention are very advantageous in that the time and labor for creating a solid model can be significantly reduced because the solid model can be synthesized even from a plurality of incomplete drawings.

What is claimed is:

1. An apparatus for creating a solid from incomplete or partly erroneous data representing a plurality of two-dimensional drawings of said solid comprising:

means for creating a wireframe model of edges from a plurality of line segments or curves derived from said plurality of two-dimensional drawings of said solid;

means for converting said wireframe model into a cell-decomposition model having a plurality of cells, each cell including a region specified by said edges;

conditions setting means for determining whether a combination of said cells indicates that at least one of said plurality of two-dimensional drawings is correct; and means, using said combination of said cells, for creating said solid model.

2. The apparatus of claim 1, wherein said wireframe model creating means further comprises:

a line segment/curve calculating means for calculating, from two-dimensional representations of the solid, line segments or curves which are components of each representation;

a configuration model creating means for creating a three-dimensional configuration model, which consists of a collection of edges, on the basis of said calculated line segments or curves;

a line segment/curve detection means for detecting line segments or curves, which are not used as edges of said three-dimensional configuration model, by comparing edges constituting said created three-dimensional configuration model with line segments or curves on said representations of said solid; and a creating means for creating a wireframe model on the basis of the detection result of said line segment/curve detection means and said three-dimensional configuration model.

3. The apparatus of claim 2 further comprising:

a display means for displaying the three-dimensional configuration model; and an input means for inputting data, which is for correcting said plurality of representations or said three-dimensional configuration model, whereby said creating means causes the result of the comparison by said line segment/curve detection means to be displayed on the display means to create a wireframe model on the basis of the line segments or curves for correcting said plurality of representations, or the edges for correcting said three-dimensional configuration model and said configuration model.

4. The apparatus of claim 1, wherein said solid model creating means further comprises:

a candidate synthesizing means for synthesizing candidate models, which are candidates of the solid model, on the basis of said combination of cells; and a solid model selection means for selecting one of said candidates as the solid model.

5. The apparatus of claim 4, wherein said candidate model synthesizing means synthesizes candidate models using any combination of cells if a combination of cells having edges formed by said line segments or curves of one of said two-dimensional representations of said solid is not found.

6. The apparatus of claim 4, wherein said solid model creating means further comprises a degree of similarity calculation means for calculating the degree of similarity between line segments or curves, which are components of representations prepared by projecting said candidate models onto a plurality of mutually perpendicular planes, and line segments or curves on said plurality of representations, whereby said solid model selection means is caused to select one of said candidate models as the solid model on the basis of said calculated degree of similarity.

7. The apparatus of claim 6 further comprising:

a display means for displaying candidate models; and an input means for inputting data, which identifies a candidate model, whereby said solid model selection means causes said display means to display said candidate models according to said calculated degree of similarity so as to select one of the candidate models as the solid model on the basis of the data input from said input means.

8. The apparatus of claim 7 further comprising:

a creating-a-plurality-of-representations means for newly creating a plurality of representations by projecting said solid model onto a plurality of mutually perpendicular planes; and means for correcting a plurality of original representations by comparing said plurality of newly created representations and the plurality of original representations so that portions on the plurality of original representations different from those on the plurality of newly created representations match those portions on the newly created representations.

9. The apparatus of claim 4 further comprising:

a display means for displaying candidate models; and an input means for inputting data, which identifies a candidate model, whereby said solid model selection means causes said display means to display said synthesized candidate models so as to select one of the candidate models as the solid model on the basis of the data input from said input means.

10. A method for creating a solid from incomplete or partly erroneous data representing a plurality of two-dimensional drawings of said solid comprising the steps of:

creating a wireframe model of edges from a plurality of line segments or curves derived from said plurality of two-dimensional drawings of said solid;

converting said wireframe model into a cell-decomposition model having a plurality of cells, each cell including a region specified by said edges;

determining whether a combination of said cells indicates that at least one of said plurality of two-dimensional drawings is correct; and using said combination of said cells for creating said solid model.

11. The method for synthesizing a solid model of claim 10 further comprising the steps of:

calculating from two-dimensional data of a plurality of representations prepared by a solid being projected onto a plurality of mutually perpendicular planes, line segments or curves, which are components of each representation;

creating a three-dimensional configuration model, which consists of a collection of edges, on the basis of said calculated line segments or curves;

detecting line segments or curves, which are not used as edges of said three-dimensional configuration model, by comparing edges constituting said created three-dimensional configuration model with line segments or curves on said plurality of representations; and creating a wireframe model on the basis of said detection result and said three-dimensional configuration model.

12. The method for synthesizing a solid model of claim 11 further comprising the steps of:

displaying said result of comparison; and creating a wireframe model on the basis of line segments or curves for correcting said plurality of input representations or edges for correcting said three-dimensional configuration model, and said configuration model.

13. The method for synthesizing a solid model of claim 10 further comprising the steps of:

synthesizing candidate models, which are candidates of the solid model, on the basis of said combination of cells; and selecting one of said synthesized candidate models as the solid model.

14. The method for synthesizing a solid model of claim 13 further comprising the step of:

synthesizing the candidate models using any combination of cells if a combination of cells having edges formed by said line segments or curves of one of said two-dimensional representations of said solid is not found.

15. The method for synthesizing a solid model of claim 13 further comprising the steps of:

calculating a degree of similarity between line segments or curves, which are components of representations prepared by projecting said candidate models onto a plurality of mutually perpendicular planes, and line segments or curves on said plurality of representations; and selecting one of the candidate models on the basis of said calculated degree of similarity.

16. The method for synthesizing a solid model of claim 15 further comprising the steps of:

displaying said candidate models according to said calculated degree of similarity; and selecting one of the candidate models on the basis of data identifying the candidate models.

17. The method for synthesizing a solid model of claim 16 further comprising the steps of:

newly creating a plurality of representations by projecting said solid model onto a plurality of mutually perpendicular planes; and comparing said plurality of newly created representations and the plurality of original representations so that portions on the plurality of original representations different from those on the plurality of newly created representations match those portions on the newly created representations.

18. The method for synthesizing a solid model of claim 13 further comprising the steps of:

displaying said synthesized candidate models; and selecting one of the candidate models on the basis of the data input.

19. A data processing system for solid model synthesizing comprising:

memory means for storing data to be processed; and processing means for processing data including:

i) means for creating a wireframe model of edges from a plurality of line segments or curves derived from a plurality of two-dimensional representations of a solid;

ii) means for converting said wireframe model into a cell-decomposition model having a plurality of cells, each cell including a region specified by said edges;

iii) conditions setting means for determining whether a combination of said cells indicates that at least one of said plurality of two-dimensional drawings is correct; and iv) means, using said combination of said cells, for creating said solid model.

* * * * *

UNITED STATES PATENT AND TRADEMARK OFFICE
CERTIFICATE OF CORRECTION

PATENT NO : 5,745,117
DATED : Apr. 28, 1998
INVENTOR(S) : Masuda et al

It is certified that error appears in the above-identified patent and that said Letters Patent is hereby corrected as shown below:

Column 9, line 14: change "loop" to --loops--.
Column 14, line 47, change "plurality of representations" to --data representing said plurality of two-dimensional drawings--.
Column 14, line 53, change "plurality of representations" to --data representing said plurality of two-dimensional drawings--.

Signed and Sealed this

Twenty-third Day of March, 1999

Attest:

Attesting Officer

Q. TODD DICKINSON

Acting Commissioner of Patents and Trademarks